United States Patent
Rui et al.

(10) Patent No.: US 11,144,770 B2
(45) Date of Patent: Oct. 12, 2021

(54) METHOD AND DEVICE FOR POSITIONING VEHICLE, DEVICE, AND COMPUTER READABLE STORAGE MEDIUM

(71) Applicant: BAIDU ONLINE NETWORK TECHNOLOGY (BEIJING) CO., LTD., Beijing (CN)

(72) Inventors: Xiaofei Rui, Beijing (CN); Shiyu Song, Beijing (CN); Wendong Ding, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 75 days.

(21) Appl. No.: 16/560,548

(22) Filed: Sep. 4, 2019

(65) Prior Publication Data
US 2020/0104614 A1    Apr. 2, 2020

(30) Foreign Application Priority Data
Sep. 29, 2018    (CN) .......................... 201811151044.9

(51) Int. Cl.
G06T 7/13    (2017.01)
G06K 9/00    (2006.01)
G06T 7/70    (2017.01)

(52) U.S. Cl.
CPC ............ *G06K 9/00825* (2013.01); *G06T 7/13* (2017.01); *G06T 7/70* (2017.01); *G06K 2209/15* (2013.01); *G06T 2207/30252* (2013.01)

(58) Field of Classification Search
CPC ........... G06K 9/00825; G06K 2209/15; G06K 2209/23; G06K 9/00214; G06K 9/00791;
(Continued)

(56) References Cited

U.S. PATENT DOCUMENTS

2007/0127779 A1    6/2007    Miyahara
2014/0334668 A1*   11/2014   Saund ...................... G06T 7/20
                                                          382/103
(Continued)

FOREIGN PATENT DOCUMENTS

JP    2008046947 A    2/2008
JP    2008052517 A    3/2008
WO    2013088626 A1   6/2013

OTHER PUBLICATIONS

Office Action for Japanese Application No. 2019-177450, dated Oct. 13, 2020, 13 pages.
(Continued)

*Primary Examiner* — Siamak Harandi
(74) *Attorney, Agent, or Firm* — Fay Sharpe LLP (57) ABSTRACT

Embodiments of the present disclosure provide a method and a device for positioning a vehicle, a device, and a computer readable storage medium. The method includes: determining first edge information of a vehicle from an image related to the vehicle and acquired by a sensing device; determining a contour model corresponding to the vehicle; determining second edge information that matches the first edge information from an edge information set associated with the contour model, in which each edge information in the edge information set corresponds to a position of the contour model relative to the sensing device; and determining a position of the vehicle relative to the sensing device based on a position corresponding to the second edge information.

17 Claims, 4 Drawing Sheets

(58) Field of Classification Search
CPC .... G06K 9/6204; G06K 9/00785; G06T 7/13; G06T 7/70; G06T 2207/30252; G06T 7/73; G06T 2207/10016; G01B 11/00; G01S 13/06; G01S 17/06
See application file for complete search history.

(56) References Cited

U.S. PATENT DOCUMENTS

2016/0350921 A1* 12/2016 Bataller ............. G06K 9/00771
2019/0147255 A1*  5/2019 Homayounfar ...... G06N 3/0454
                                                                701/23

OTHER PUBLICATIONS

European Search Report for European Application No. 19194001.4, dated Mar. 13, 2020.
Jun Yang et al., "Vehicle Detection and Tracking with Low-Angle Cameras", Proceedings of 2010 IEEE 17th International Conference on Image Processing, Sep. 26-29, 2010, 4 pages.

* cited by examiner

METHOD AND DEVICE FOR POSITIONING VEHICLE, DEVICE, AND COMPUTER READABLE STORAGE MEDIUM

CROSS-REFERENCE TO RELATED APPLICATIONS

This application claims priority to and benefits of Chinese Patent Application No. 201811151044.9, filed with the National Intellectual Property Administration of P. R. China on Sep. 29, 2018, the entire contents of which are incorporated herein by reference.

TECHNICAL FIELD

The present disclosure relates to the field of intelligent driving, and more particularly, to a method and a device for positioning a vehicle, a device, and a computer readable storage medium.

BACKGROUND

In recent years, autonomous driving and assisted driving have developed rapidly. In the field of autonomous driving and assisted driving, high-precision positioning of the vehicle is important. In practical applications, global satellite navigation system (GNSS) positioning may have errors of up to 10 meters or more. Some autonomous driving and assisted driving vehicles can achieve higher precision positioning by combining high-precision inertial navigation system (INS) and GNSS, or by combining high-precision maps and laser radars. However, such manner is costly and can be affected by external environments. Therefore, it becomes a focus of attention to achieve high-precision positioning of the vehicle.

SUMMARY

Embodiments of the present disclosure provide a solution for controlling autonomous driving of a vehicle.

The present disclosure provides a method for positioning a vehicle. The method includes: determining first edge information of a vehicle from an image related to the vehicle and acquired by a sensing device; determining a contour model corresponding to the vehicle; determining second edge information that matches the first edge information from an edge information set associated with the contour model, in which each edge information in the edge information set corresponds to a position of the contour model relative to the sensing device; and determining a position of the vehicle relative to the sensing device based on a position corresponding to the second edge information.

The present disclosure provides a device including one or more processors, and a storage device. The storage device is configured to store one or more programs. When the one or more programs are executed by the one or more processors, the electronic device is caused to implement the method according to embodiments of the present disclosure.

The present disclosure provides a computer readable storage medium having a computer program stored thereon. When the computer program is executed by a processor, the method according to embodiments of the present disclosure is caused to be implemented.

It is to be understood that, the content described in the summary is not intended to limit the key or important features of the present disclosure, or the scope of the present disclosure. Other features of the present disclosure will be readily understood by the following description.

BRIEF DESCRIPTION OF THE DRAWINGS

These and other aspects and advantages of embodiments of the present disclosure will become apparent and more readily appreciated from the following descriptions made with reference to the drawings. In the drawings, the same or similar reference numerals indicate the same or similar elements, in which.

DETAILED DESCRIPTION

The present disclosure will be described in detail below with reference to the accompanying drawings. Although certain embodiments of the present disclosure are shown in the drawings, it should be understood that, the present disclosure may be implemented in various forms, and should not be construed as being limited to the embodiments set forth herein. Instead, the embodiments are provided to provide a more complete and clear understanding of the present disclosure. It should be understood that, the drawings and embodiments of the present disclosure are for illustrative purpose only and are not intended to limit the scope of the present disclosure.

In the description of embodiments of the present disclosure, the term "include" and the like should be understood as open inclusion, i.e., "including but not limited to". The term "based on" should be understood as "at least partially based on". The term "one embodiment" or "the embodiment" should be understood as "at least one embodiment". The terms "first", "second" and the like may refer to different or identical objects. Other explicit and implicit definitions may also be included below.

As mentioned above, the high-precision positioning of the vehicle is the basis for achieving autonomous driving. In positioning technology in the related art, GNSS positioning cannot meet the precision requirement of autonomous driving, and positioning based on the high-precision map requires the vehicle to be equipped with high-cost laser radar, and the map suppliers are also required to maintain the high precision map to ensure the accuracy of the high-precision map.

In recent years, with the advancement of communication technology, vehicle-to-everything (V2X) technology has been developed rapidly. When a vehicle determines its position, it can improve the positioning accuracy by using positioning information determined by a roadside device or positioning information determined by other vehicles. For example, the vehicle on the road may be positioned based on the image of the vehicle taken by a roadside camera. In the related art, the roadside camera may extract contour information of the vehicle from a video image by image processing algorithms such as edge extraction, and estimate the geographic position of the vehicle based on the position of the contour information in the image and the calibration information of the roadside camera. Such positioning manner tends to have large errors, and cannot achieve the accuracy requirement of autonomous driving.

Embodiments of the present disclosure provide a solution for positioning a vehicle using a sensing device. In the solution, the sensing device may acquire an image related to the vehicle, and determine edge information of the vehicle from the image. The sensing device may also acquire a contour model corresponding to a target vehicle, and determine edge information that matches the first edge information from an edge information set associated with the contour model. The matched edge information corresponds to the position of the contour model relative to the sensing device. Based on the position of the contour model, the sensing device can determine the geographic position of the vehicle. By adjusting the coordinate and angle of the pre-stored vehicle contour model relative to the sensing device to match vehicle edge information in the video image, the sensing device can accurately determine the position and angle of the vehicle.

Embodiments of the present disclosure will be described in detail below with reference to the drawings.

Figure 1:
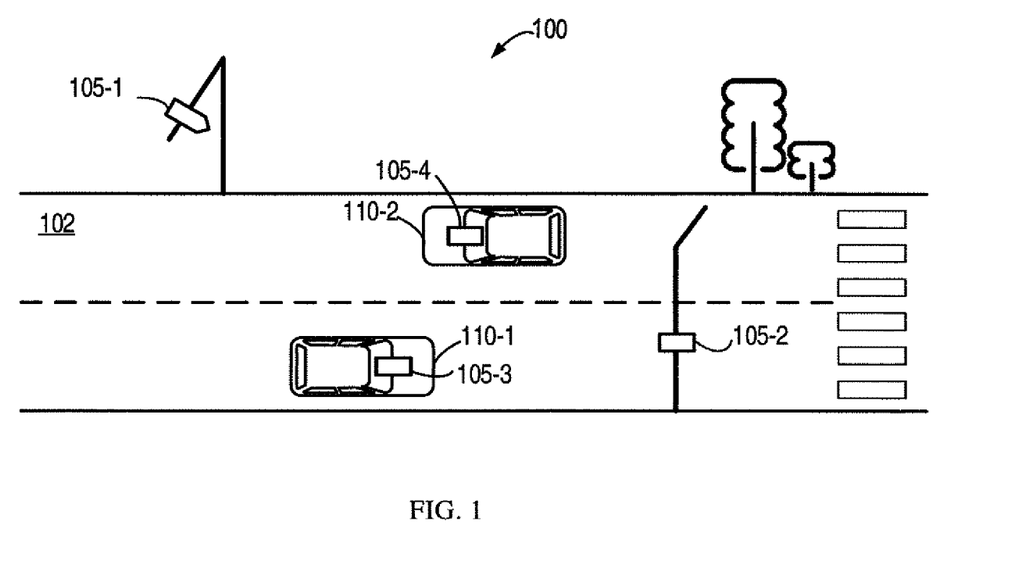
FIG. 1 is a schematic diagram of an exemplary environment for implementing an embodiment of the present disclosure.

FIG. 1 is a schematic diagram of an exemplary environment 100 for implementing an embodiment of the present disclosure. As illustrated in FIG. 1, the exemplary environment 100 may include a road 102, one or more sensing devices 105-1, 105-2, 105-3 and 105-4, and one or more vehicles 110-1, 110-2. For convenience of description, the plurality of sensing devices 105-1, 105-2, 105-3, and 105-4 are collectively referred to as the sensing device 105, and the plurality of vehicles 110-1, 110-2 are collectively referred to as the vehicle 110. It should be understood that, the illustrated facilities and objects are for illustrative purposes only, and objects presented in different traffic environments may vary depending on actual situations. The scope of the present disclosure is not limited in this respect.

In FIG. 1, one or more vehicles 110-1, 110-2 are traveling on the road 102. Vehicle 110 may be any type of vehicle that can carry persons and/or objects, and be moved by a power system such as an engine, including but not limited to cars, trucks, buses, electric vehicles, motorcycles, recreational vehicles, trains, etc. The one or more of vehicles 110 in the environment 100 may be unmanned vehicles, which have the autonomous driving capability. Certainly, the other or some of the vehicles 110 in the environment 100 may not have the autonomous driving capability.

In an embodiment, the sensing device 105 (e.g., 105-1 and 105-2) in the environment 100 may be a roadside device that is independent of the vehicle 110 for monitoring the condition of the environment 100, so as to acquire perceptive information related to the environment 100. In some embodiments, the sensing device 105 (e.g., 105-1) may be disposed above the road 102. In some embodiments, the sensing device 105 (e.g., 105-2) may be disposed on both sides of the road 102. In some embodiments, the sensing device 105 (e.g., 105-3 and 105-4) may be mounted on the vehicle 110. In an embodiment, the sensing device 105 may include an image sensor, to acquire image information of the road 102 and the vehicle 110 in the environment 100. In some embodiments, the sensing device may also include one or more other types of sensors, such as a laser radar, or a millimeter wave radar.

Figure 2:
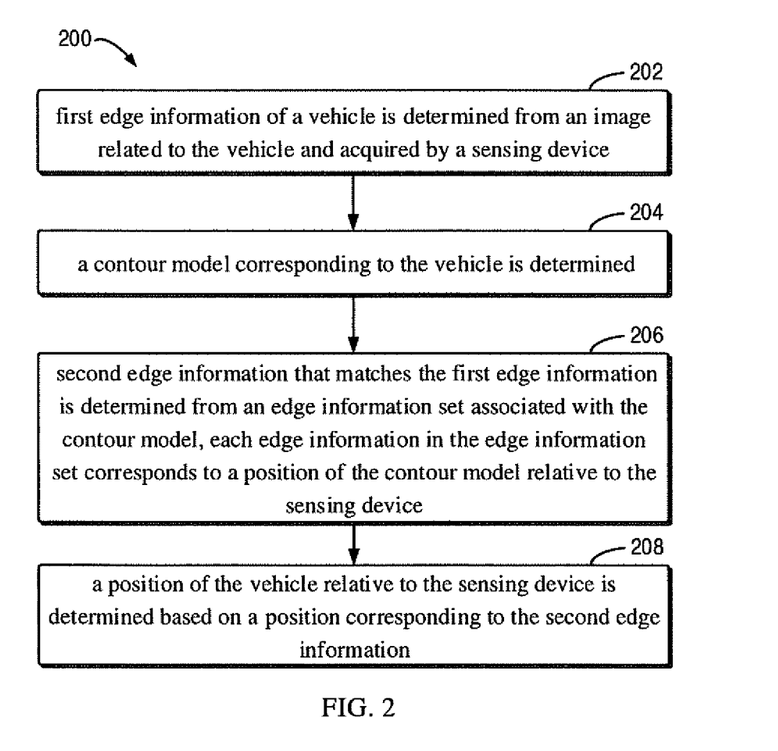
FIG. 2 is a flow chart of a method for positioning a vehicle according to an embodiment of the present disclosure.

The process of positioning a vehicle according to an embodiment of the present disclosure will be described below with reference to FIG. 2 to FIG. 5. For convenience of description, the process of positioning the vehicle 110 using the sensing device 105 may be described with a roadside device as an example. It should be understood that, based on the solution of the present disclosure, it may also be possible to locate another vehicle using the sensing device (e.g. 105-3 and 105-4) mounted on the vehicle. FIG. 2 is a flow chart of a method 200 for positioning a vehicle according to an embodiment of the present disclosure. The method 200 may be performed by the sensing device 105 shown in FIG. 1.

At block 202, the sensing device 105 determines edge information (hereinafter referred to as first edge information for convenience of description) of a vehicle from an image related to the vehicle.

In some embodiments, when the vehicle 110 passes through the area near the sensing device 105, the sensing device 105 may acquire the image related to the vehicle 110.

In some embodiments, the sensing device 105 may determine the first edge information indicating the edge of the vehicle 110 by using edge extraction algorithms in the related art, such as the Canny edge detection algorithm, the machine learning and target segmentation algorithm, etc. It should be understood that, the edge extraction algorithms described above are merely illustrative, and other suitable edge extraction algorithms may be employed to determine the edge information of the vehicle 110.

Figure 3:
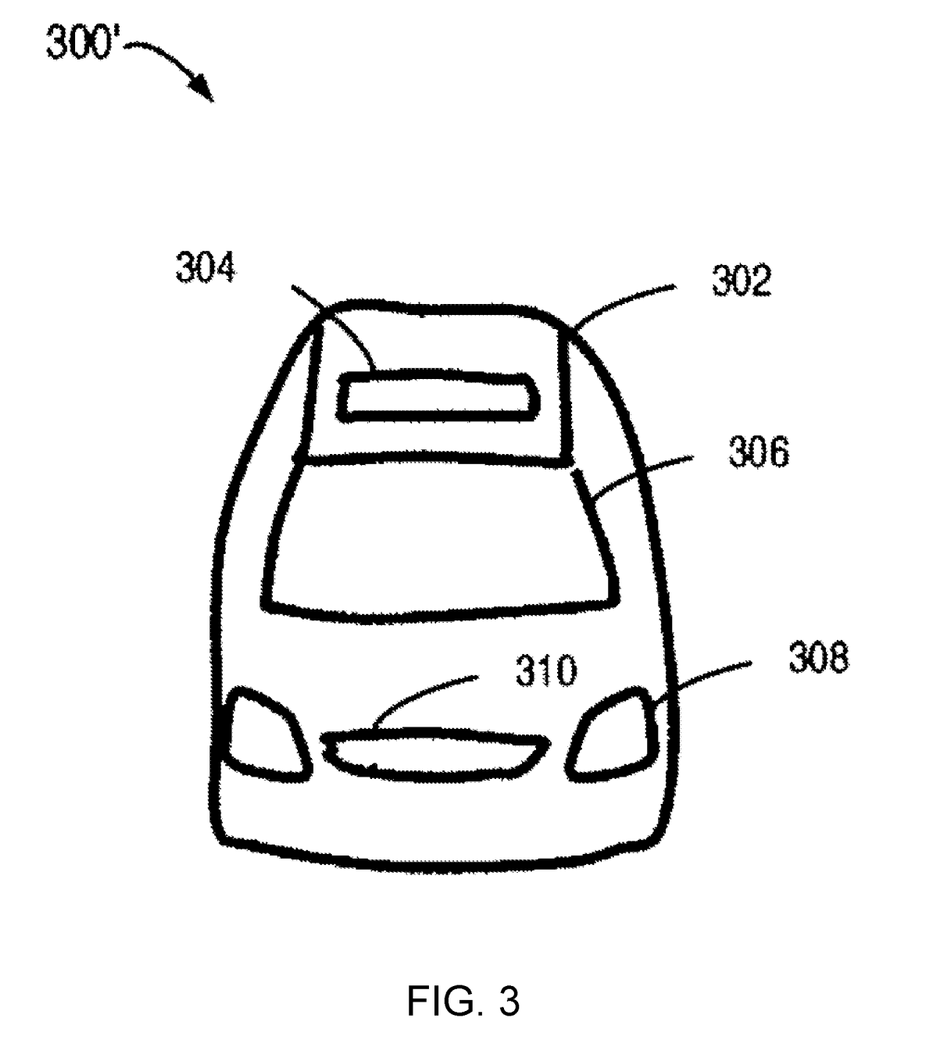
FIG. 3 is a schematic diagram of first edge information of a vehicle according to an embodiment of the present disclosure.

FIG. 3 is a schematic diagram of edge information 300' of the vehicle 110 to be positioned according to an embodiment of the present disclosure. In some embodiments, the sensing device 105 may determine at least one component of the vehicle 110 from the image 300 by utilizing approaches such as machine learning. Examples of the component may include, but are not limited to, a window, a sunroof, a headlight, an active grille shutter, etc. The sensing device 105 may extract the edge of each of the at least one component in the image 300 by the edge extraction algorithm described above. FIG. 3 illustrates the body edge 302, the sunroof edge 304, the front window edge 306, the headlight edge 308 and the active grille shutter edge 310 of the vehicle 110 extracted from the image 300. It should be understood that, these components are merely illustrative, and the sensing device 105 may also extract edge information of other components of the vehicle 110 in the image 300.

At block 204, the sensing device 105 determines a contour model corresponding to a vehicle.

In some embodiments, the sensing device 105 may determine identification information of the vehicle 110 from the image 300. In some embodiments, the identification information may include registration plate information of the vehicle 110. For example, the sensing device 105 may determine the registration plate information of the vehicle 110 from the image 300 by an image recognition algorithm. It should be understood that, any suitable image recognition algorithm may be employed to determine registration plate information of the vehicle 110, which is not described in detail herein.

In some embodiments, the identification information may include other information related to the vehicle 110, such as barcode information and radio frequency identification (RFID) information. For example, the barcode information may be printed or affixed to the outer casing of the vehicle 110, or the vehicle 110 may be fitted with an RFID tag. By identifying the barcode information or reading the RFID information, the sensing device 105 can determine identification information of the vehicle 110, such as registration plate of the vehicle 110 or the model of the vehicle 110, etc.

In some embodiments, the sensing device 105 may determine the contour model corresponding to the vehicle 110 from a preset contour model set based on the identification information. The sensing device 105 may store a preset contour model set, which may include contour models corresponding to different registration plate information. The sensing device 105 can determine the contour model corresponding to the vehicle 110 based on the registration plate information of the vehicle 110.

In some embodiments, the contour model set may include contour models corresponding to different vehicle models. The sensing device 105 may determine the model of the vehicle 110 based on the registration plate information of the vehicle 110 or information such as barcode/RFID, and determine the contour model corresponding to the vehicle 110 from the contour model set based on the model of the vehicle 110.

In some embodiments, the contour model set may be stored at a computing device separate from the sensing device 105. The sensing device 105 may send identification information of the vehicle 110 or the model of the vehicle 110 determined based on the identification information to the computing device, thereby requesting the contour model corresponding to the vehicle 110 from a server. After the request is received, the computing device may determine the contour model corresponding to the vehicle 110 from the contour model set based on the identification information or the model of the vehicle 110, and send the contour model to the sensing device 105.

Figure 4:
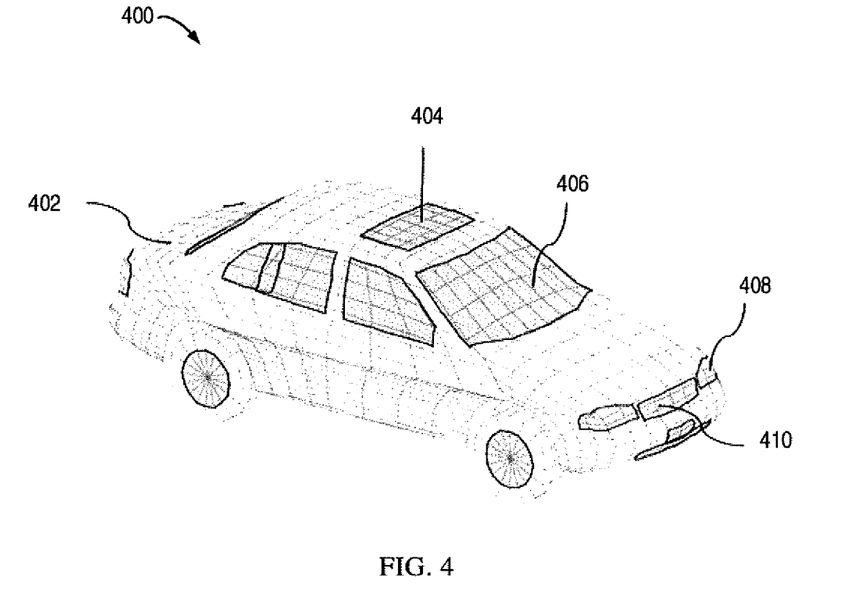
FIG. 4 is a schematic diagram of a contour model of a vehicle according to an embodiment of the present disclosure.

FIG. 4 is a schematic diagram of a contour model 400 of a vehicle according to an embodiment of the present disclosure. In the example shown in FIG. 4, the sensing device 105 determines a contour model 400 corresponding to the vehicle 110 from the contour model set. In some embodiments, the contour model 400 may include, for example, contour information as well as physical size information corresponding to the vehicle 110. In some embodiments, the contour model 400 may include contour information associated with different components of the vehicle 110. For example, as shown in FIG. 4, the contour model 400 may include a rear window contour 402, a sunroof contour 404, a front window contour 406, a headlight contour 408, and an active grille shutter contour 410. In some embodiments, the contour model 400 may be converted into a plurality of lines in a coordinate system originating from the contour model (hereinafter referred to as a first coordinate system for convenience of description), and these lines may be represented as equations in the first coordinate system.

At block 206, the sensing device 105 determines edge information (hereinafter referred to as second edge information for convenience of description) that matches the first edge information from an edge information set associated with the contour model. Each edge information in the edge information set corresponds to a position of the contour model relative to the sensing device 105.

In some embodiments, the sensing device 105 may set the initial position of the contour model 400 relative to the sensing device 105 to $X^T=(x,y,z,\alpha,\beta,\gamma)$, where $(x,y,z)$ denotes the coordinate of the center of the contour model 400 at a coordinate system originating from the sensing device 105 (hereinafter referred to as a second coordinate system for convenience of description), $(\alpha,\beta,\gamma)$ denotes the Euler angle of the first coordinate relative to the second coordinate system, which embodies pitch, roll and yaw information of the contour model 400 relative to the sensing device 105. In some embodiments, the initial position of the contour model 300 relative to the sensing device 105 may be determined based on the center of the vehicle 110 in the image 300. For example, in some embodiments, the sensing device 105 may convert the two-dimensional (2D) coordinates of the center of the vehicle 110 in the image 300 to a position in the second coordinate system according to its calibration information, and take the position as the initial position of the contour model 400. It should be understood that, the conversion of the 2D coordinates of the center of the vehicle 110 in the image 300 to the position in the second coordinate system may be performed by well-known coordinate conversion manners in the related art, which will not be described in detail herein.

Figure 5:
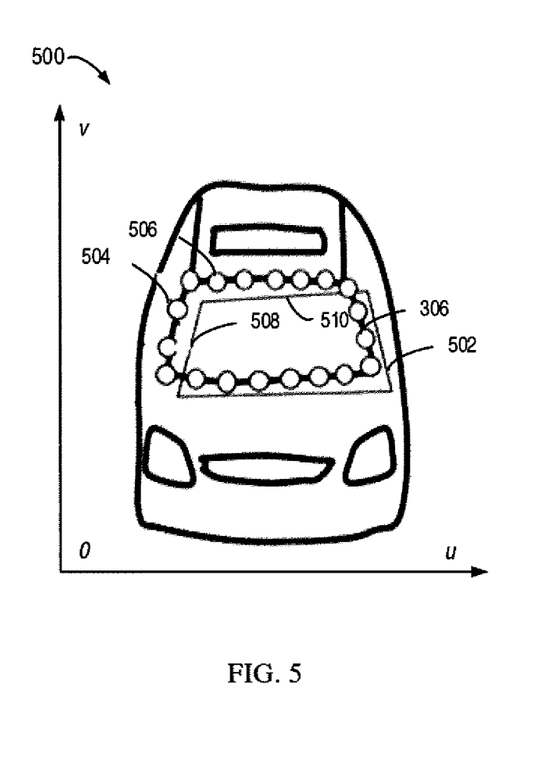
FIG. 5 is a schematic diagram of second edge information according to an embodiment of the present disclosure.

In some embodiments, based on the determined position of the contour model 400 relative to the sensing device 105 and its calibration information, the sensing device 105 may determine edge information corresponding to the contour model 400 in a 2D coordinate system of the image 300 (hereinafter referred to as a third coordinate system for convenience of description). For example, FIG. 5 is a schematic diagram 500 of second edge information according to an embodiment of the present disclosure. As shown in FIG. 5, taking the front window contour 406 as an example, the sensing device 105 can determine a contour line 502 corresponding to the front window contour 406 in the third coordinate system based on the position of the contour model 400. In detail, the sensing device 105 may also obtain an equation of each of the one or more line segments constituting the contour line 502 in the third coordinate system.

In some embodiments, the sensing device 105 may determine a distance between the edge (hereinafter referred to as a first edge for convenience of description) indicated by the first edge information and the edge indicated by the edge information projected by the contour model 400 projected in the third coordinate system. As shown in FIG. 5, taking the front window contour 406 as an example, the sensing device 105 may determine the distance between the front window edge 306 and the contour line 502 in the coordinate system of the image 300. In some embodiments, the sensing device 105 determines a plurality of points on the first edge. For example, the sensing device 105 may sample a plurality of points 504, 506 from the front window edge 306, and calculate a distance between each of the plurality of points 504, 506 and the contour line 502, respectively.

In some embodiments, the sensing device 105 may determine a line segment that is closest to the point 504 or 506, and calculate the shortest distance from the point 504 or 506 to the line segment. Taking the point 504 in FIG. 5 as an example, the coordinates of the point 504 in the third coordinate system may be represented as $(u_0, v_0)$, and the line segment that is closest to the point 504 is line segment 580. The equation of the line segment 508 in the third coordinate system may be, for example, expressed as $au+bv+1=0$, where u and v are coordinate axes of the third coordinate system, and a and b are coefficients of the linear equation of the line segment 508 in the third coordinate system. The distance D from the point 504 to the line segment 508 may be expressed as:

$$D = \frac{|au_0 + bv_0 + 1|}{\sqrt{a^2 + b^2}} \quad (1)$$

Since the position of the contour model 400 of the vehicle 110 in the first coordinate system is known, the coefficients a and b of the linear equation may be expressed as a function of the position $X^T=(x,y,z,\alpha,\beta,\gamma)$ of the contour model 400 relative to the sensing device 105, for example, a and b may be expressed as:

$$a = f_1(x,y,z,\alpha,\beta,\gamma) \quad (2)$$

$$b = f_2(x,y,z,\alpha,\beta,\gamma) \quad (3)$$

By substituting the function (2) of a and function (3) of b into equation (1), it can be obtained that $D=F(x,y,z,\alpha,\beta,\gamma)$. In the same manner, the distance from the point 506 to the contour line 502 may be determined as the distance from the point 506 to the nearest line segment 510, which may also be represented as a function of position $X^T=(x,y,z,\alpha,\beta,\gamma)$.

In some embodiments, the sensing device 105 may determine the sum of distances between the plurality of points on the edge indicated by the edge information and the contour line. Specifically, in the example of FIG. 5, in the case where only the front window edge 306 is considered, the distance between the front window edge 306 and the contour line 502 at the coordinate system of the image 300 may be represented as the sum E of the distances between the plurality of points 504 and 506 and the contour line 502. Thus, E can be expressed as a function of the position of the contour model 400 in the second coordinate system:

$$E = \Sigma F_i(x,y,z,\alpha,\beta,\gamma) = g(x,y,z,\alpha,\beta,\gamma)$$

where i denotes the number of the plurality of points. It should be understood that, E may include the sum of the distances of a plurality of points on the edge (e.g., the body edge 302, the sunroof edge 304, the headlight edge 308, and the active grille shutter edge 310) corresponding to the other components to the corresponding contour lines.

It should be understood that, the smaller the sum E is, the closer the contour model 400 will be to the true position of the vehicle 110. Therefore, the sensing device 105 needs to make the second edge indicated by the second edge information corresponding to the contour model coincide with the first edge indicated by the first edge information 300' in the image 300 as much as possible.

In some embodiments, the sensing device 105 may perform iterative adjustment based on the initial position $X^T=(x,y,z,\alpha,\beta,\gamma)$ of the center of the contour model 400 in the second coordinate system. Specifically, the sensing device 105 may compare the sum E obtained when the contour model 400 is located at different positions in the second coordinate system with a preset distance threshold. When the sum E is less than the distance threshold, the sensing device 105 may match the second edge information corresponding to the contour model 400 with the first edge information. The sensing device 105 may record the position $X1^T=(x1,y1,z1,\alpha1,\beta1,\gamma1)$ of the contour model 400 in the second coordinate system and stop iterating.

In some embodiments, the sensing device 105 may adjust the position of the contour model 400 in the second coordinate system based on Newton's method, to determine the second edge information that matches the first edge information 300'. Specifically, the sensing device 105 may solve a better position based on the following equation at each iteration:

$$X_{k+1}^T = X_k^T - \nabla^2 g(X_k^T)^{-1} g(X_k^T)$$

Where $X_{k+1}^T$ represents a position selected in the next iteration, $X_k^T$ represents the current position before adjustment. The sensing device 105 can terminate the iteration when the following convergence condition (i.e., the distance between adjusted adjacent positions is less than a predetermined threshold) is satisfied:

$$\|X_{k+1}^T - X_k^T\| < \varepsilon$$

Based on the Newton's method, the sensing device 105 can determine the position of the contour model 400 in the second coordinate system when the convergence condition is satisfied, for example, the position may be represented as $X1^T=(x1,y1,z1,\alpha1,\beta1,\gamma1)$.

Through the above method, the sensing device 105 may determine the second edge from the plurality of edges indicated by the edge information set, where the sum of distances between the second edge and the plurality of points is less than the preset threshold, and select edge information indicating the second edge from the edge information set as the second edge information. It should be understood that, the above method is merely illustrative, and any other suitable method may be employed to solve for position having the minimum sum of distances.

As illustrated in FIG. 2, at block 208, the sensing device 105 determines the position of the vehicle 110 relative to the sensing device based on the position corresponding to the second edge information.

As described above, the sensing device 105 may output the position of the contour model 400 in the second coordinate system as the position of the vehicle 110 relative to the sensing device 105.

In some embodiments, after the second edge information that matches the first edge information 300' is determined, the sensing device 105 can determine the position (such as $X1^T=(x1,y1,z1,\alpha1,\beta1,\gamma1)$) of the contour model 400 corresponding to the second edge information in the second coordinate system. In some embodiments, the sensing device 105 can derive a conversion matrix from the second coordinate system to a world coordinate system based on its calibration information. Based on the conversion matrix, the sensing device 105 may convert the position of the vehicle 110 relative to the sensing device 105 (i.e., the position $X1^T=(x1,y1,z1,\alpha1,\beta1,\gamma1)$ of the contour model 400 in the second coordinate system) to a geographic position $X2^T=(x2,y2,z2,\alpha2,\beta2,\gamma2)$ in the world coordinate system, the geographic position may include the three-dimensional (3D) coordinate and the Euler angle of the vehicle 110 in the world coordinate system.

Based on such a positioning manner, the sensing device not only considers the approximate area of the vehicle in the 2D image, but also utilizes the precise contour model of the vehicle, and projects the contour model into the 2D image, such that the projected line matches the edge of the vehicle in the 2D image as much as possible, and the geographic position of the vehicle can be determined more accurately.

In some embodiments, the sensing device 105 may transmit the geographic position of the vehicle 110 to the vehicle 110. In some embodiments, for example, the vehicle 110 may receive the geographic position information, to fuse with the self-positioning information of the vehicle 110 to obtain a more accurate position. In some embodiments, the vehicle 110 may control the its driving based on the acquired geographic position information.

In some embodiments, the sensing device 105 may transmit the position of the vehicle 110 relative to the sensing device 105 to the vehicle 110, and the vehicle 110 can determine the geographic position of the vehicle 110 in the world coordinate system based on the relative position information and the position of the sensing device 105.

Figure 6:
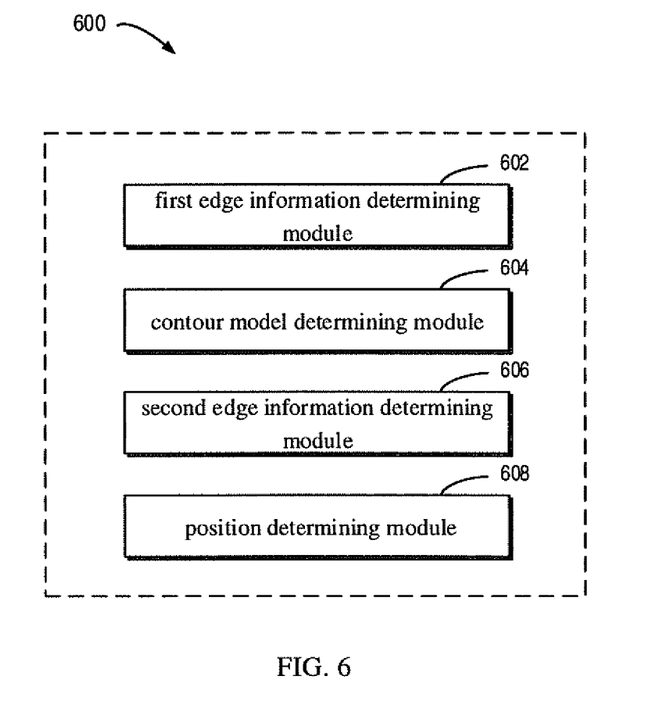
FIG. 6 is a block diagram of a device for positioning a vehicle according to an embodiment of the present disclosure.

FIG. 6 is a block diagram of a device 500 for positioning a vehicle according to an embodiment of the present disclosure. The device 600 may be included in the sensing device 105 of FIG. 1 or may be realized as the sensing device 105. As shown in FIG. 6, the device 600 includes a first edge information determining module 602, a contour model determining module 604, a second edge information determining module 606, and a position determining module 608.

The first edge information determining module 602 is configured to determine first edge information of a vehicle from an image related to the vehicle and acquired by a sensing device. The contour model determining module 604 is configured to determine a contour model corresponding to the vehicle. The second edge information determining module 606 is configured to determine second edge information that matches the first edge information from an edge information set associated with the contour model. Each edge information in the edge information set corresponds to a position of the contour model relative to the sensing device. The position determining module 608 is configured to determine a position of the vehicle relative to the sensing device based on a position corresponding to the second edge information.

In some embodiments, the first edge information determining module 602 may include a component configuration module, and an edge extraction module. The component configuration module is configured to determine at least one component of the vehicle from the image. The edge extraction module is configured to extract an edge of each of the at least one component.

In some embodiments, the contour model determining module 604 may include an identification information determining module, and a first contour model determining module. The identification information determining module is configured to determine identification information of the vehicle from the image. The first contour model determining module is configured to determine the contour model corresponding to the vehicle from a preset contour model set based on the identification information.

In some embodiments, the identification information includes registration plate information of the vehicle.

In some embodiments, the second edge information determining module 606 includes a point determining module, a second edge determining module, and a second edge information selection module. The point determining module is configured to determine a plurality of points on a first edge indicated by the first edge information. The second edge determining module is configured to determine a second edge from a plurality of edges indicated by the edge information set. A sum of distances between the second edge and the plurality of points is less than a preset threshold. The second edge information selection module is configured to select edge information indicating the second edge from the edge information set, as the second edge information.

In some embodiments, the position determining module 608 includes a coordinate and Euler angle acquiring module. The coordinate and Euler angle acquiring module is configured to determine a coordinate and a Euler angle of the vehicle in a roadside coordinate system having the sensing device as an origin.

In some embodiments, the device 600 includes a conversion matrix acquiring module, and a geographic position conversion module. The conversion matrix acquiring module is configured to obtain a conversion matrix from a roadside coordinate system having the sensing device as an origin to a world coordinate system. The geographic position conversion module is configured to convert the position of the vehicle relative to the sensing device to a geographic position of the vehicle based on the conversion matrix.

In some embodiments, the device 600 further includes a transmitting module. The transmitting module is configured to transmit the geographic position to the vehicle.

Figure 7:
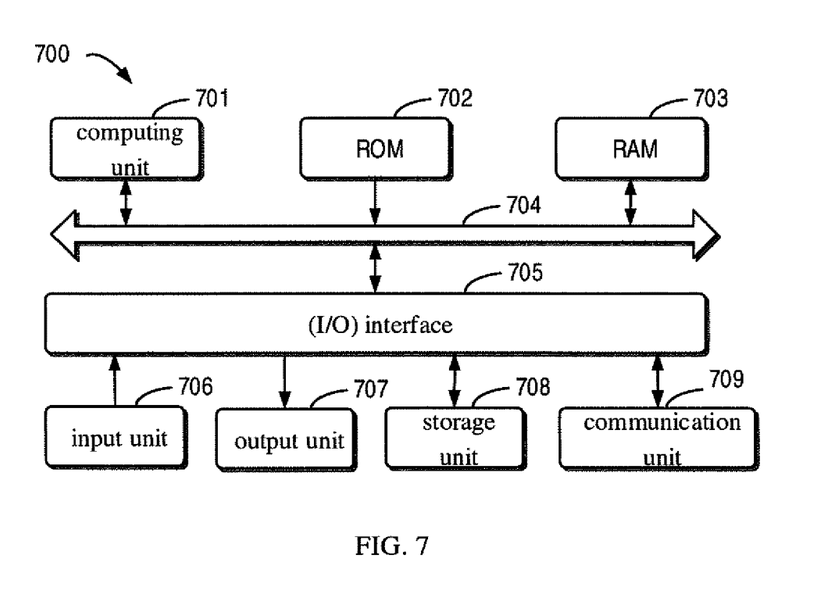
FIG. 7 is a block diagram of a computing device capable of implementing an embodiment of the present disclosure.

FIG. 7 is a block diagram of an exemplary device 700 capable of implementing an embodiment of the present disclosure. The device 700 may be configured to implement the sensing device 105 of FIG. 1. As shown in FIG. 7, the device 700 includes a computing unit 701, which may be configured to perform various appropriate operations and processes based on computer program instructions stored in a ROM 702 or computer program instructions loaded from a storage unit 708 into a RAM 703. The RAM 703 may store various programs and data required for operations of the device 700. The CPU 701, the ROM 702 and the RAM 703 may be connected to each other through a bus 704. The input/output (I/O) interface 705 may also be coupled to the bus 704.

A plurality of components in the device 700 are coupled to the I/O interface 705, including: an input unit 706 such as a keyboard, a mouse, etc., an output unit 707 such as various types of displays, speakers, etc., a storage unit 708 such as a disk, an optical disk or the like, and a communication unit 709 such as a network card, a modem, a wireless communication transceiver, or the like. The communication unit 709 allows the device 700 to exchange information/data with other devices over a computer network such as Internet and/or various telecommunication networks.

The computing unit 701 may include a variety of general purpose and/or special processing components with processing and computing capabilities. Examples of the computing unit 701 may include, but are not limited to, a central processing unit (CPU), a graphic processing unit (GPU), various specialized artificial intelligence (AI) computing chips, various computing units for running machine learning model algorithms, a digital signal processor (DSP), and any suitable processor, controller, microcontroller. The computing unit 701 can perform various methods and processes described above, such as the method 200. For example, in some embodiments, the method 200 may be implemented as a computer software program that is tangibly embodied in a machine readable medium, such as the storage unit 708. In some embodiments, some or all of the computer program may be loaded and/or installed on the device 700 via ROM 702 and/or the communication unit 709. One or more steps of the method 200 described above may be performed when the computer program is loaded into RAM 703 and executed by the computing unit 701. Alternatively, in other embodiments, the computing unit 701 may be configured to perform the method 200 by any other suitable means (e.g., by means of firmware).

The functions described above may be performed, at least in part, by one or more hardware logic components. For example, without any limitation, the exemplary type of the hardware logic component may include: Field Programmable Gate Array (FPGA), Application Specific Integrated Circuit (ASIC), Application Specific Standard Product (ASSP), System on Chip (SOC), Complex Programmable Logic Device (CPLD), etc.

The program code for implementing the method of the present disclosure may be written in any combination of one or more programming languages. The program code may be provided to a general-purpose computer, a special purpose computer or a processor or controller of other programmable data processing devices, such that the program code, when executed by the processor or controller, causes the functions/operations specified in the flowcharts and/or block diagrams to be implemented. The program code may be executed entirely on a machine, partially on a machine, partially on the machine as a separate package, partially on a remote machine, or entirely on a remote machine or server.

In the context of the present disclosure, a machine-readable medium may be a tangible medium that may contain or store programs for use by or in combination with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor system, apparatus or device, or any suitable combination of the above. More specific examples of the machine-readable storage medium may include electrical connections based on one or more wires, a portable computer disk, a hard disk, a random access memory (RAM), a read-only memory (ROM), an erasable programmable read-only memory (EPROM or Flash memory), an optical fiber, a compact disk-only memory (CD-ROM), an optical storage device, a magnetic storage device, or any suitable combination of the above.

In addition, although the operations are depicted in a particular order, it should be understood that such operations are required to be performed in the particular order shown or in the order, or that all illustrated operations should be performed to achieve the desired results. Multitasking and parallel processing may be advantageous in certain circumstances. Likewise, although several specific implementation details are included in the above discussion, these should not be construed as restrictions on the scope of the present disclosure. Certain features described in the context of individual embodiments may also be implemented in combination in a single implementation. Instead, various features described in the context of a single implementation may also be implemented in a plurality of implementations, either individually or in any suitable sub-combination.

Although the present disclosure has been described in language specific to structural features and/or methodological acts, it is understood that the subject matter defined in the appended claims is not limited to the specific features or acts described. Instead, the specific features and acts described above are merely exemplary forms of implementing the claims.

What is claimed is:

1. A method for positioning a vehicle, comprising:
   determining first edge information of a vehicle from an image related to the vehicle and acquired by a sensing device;
   determining a contour model corresponding to the vehicle;
   determining second edge information that matches the first edge information from an edge information set associated with the contour model, wherein each edge information in the edge information set corresponds to a position of the contour model relative to the sensing device; and
   determining a position of the vehicle relative to the sensing device based on a position corresponding to the second edge information.

2. The method according to claim 1, wherein determining the first edge information comprises:
   determining at least one component of the vehicle from the image; and
   extracting an edge of each of the at least one component.

3. The method according to claim 1, wherein determining the contour model comprises:
   determining identification information of the vehicle from the image; and
   determining the contour model corresponding to the vehicle from a preset contour model set based on the identification information.

4. The method according to claim 3, wherein the identification information comprises registration plate information of the vehicle.

5. The method according to claim 1, wherein determining the second edge information that matches the first edge information from the edge information set associated with the contour model comprises:
   determining a plurality of points on a first edge indicated by the first edge information;
   determining a second edge from a plurality of edges indicated by the edge information set, wherein a sum of distances between the second edge and the plurality of points is less than a preset threshold; and
   selecting edge information indicating the second edge from the edge information set, as the second edge information.

6. The method according to claim 1, wherein determining the position of the vehicle relative to the sensing device comprises:
   determining a coordinate and a Euler angle of the vehicle in a roadside coordinate system having the sensing device as an origin.

7. The method according to claim 1, further comprising:
   obtaining a conversion matrix from a roadside coordinate system having the sensing device as an origin to a world coordinate system; and
   converting the position of the vehicle relative to the sensing device to a geographic position of the vehicle based on the conversion matrix.

8. The method according to claim 7, further comprising:
   transmitting the geographic position to the vehicle.

9. A device for positioning a vehicle, comprising:
   one or more processors; and
   a storage device, configured to store one or more programs,
   wherein when the one or more programs are executed by the one or more processors, causes the one or more processors to:
   determine first edge information of a vehicle from an image related to the vehicle and acquired by a sensing device;
   determine a contour model corresponding to the vehicle;
   determine second edge information that matches the first edge information from an edge information set associated with the contour model, wherein each edge information in the edge information set corresponds to a position of the contour model relative to the sensing device; and determine a position of the vehicle relative to the sensing device based on a position corresponding to the second edge information.

10. The device according to claim 9, wherein in determining the first edge information, the one or more processors are configured to:
   determine at least one component of the vehicle from the image; and
   extract an edge of each of the at least one component.

11. The device according to claim 9, wherein in determining the contour model, the one or more processors are configured to:
   determine identification information of the vehicle from the image; and
   determine the contour model corresponding to the vehicle from a preset contour model set based on the identification information.

12. The device according to claim 11, wherein the identification information comprises registration plate information of the vehicle.

13. The device according to claim 9, wherein in determining the second edge information that matches the first edge information from the edge information set associated with the contour model, the one or more processors are configured to:
   determine a plurality of points on a first edge indicated by the first edge information;
   determine a second edge from a plurality of edges indicated by the edge information set, wherein a sum of distances between the second edge and the plurality of points is less than a preset threshold; and
   select edge information indicating the second edge from the edge information set, as the second edge information.

14. The device according to claim 9, wherein in determining the position of the vehicle relative to the sensing device, the one or more processors are configured to:
   determine a coordinate and a Euler angle of the vehicle in a roadside coordinate system having the sensing device as an origin.

15. The device according to claim 9, wherein the one or more processors are further configured to:
   obtain a conversion matrix from a roadside coordinate system having the sensing device as an origin to a world coordinate system; and
   convert the position of the vehicle relative to the sensing device to a geographic position of the vehicle based on the conversion matrix.

16. The device according to claim 15, wherein the one or more processors are further configured to:
   transmit the geographic position to the vehicle.

17. A non-transitory computer readable storage medium having stored thereon a computer program that, when executed by a processor, causes a method for positioning a vehicle to be implemented, the method comprising:
   determining first edge information of a vehicle from an image related to the vehicle and acquired by a sensing device;
   determining a contour model corresponding to the vehicle;
   determining second edge information that matches the first edge information from an edge information set associated with the contour model, wherein each edge information in the edge information set corresponds to a position of the contour model relative to the sensing device; and
determining a position of the vehicle relative to the sensing device based on a position corresponding to the second edge information.

* * * * *